May 26, 1970     E. B. CUPP ET AL     3,514,331

BATTERY ELECTRODE SEPARATION

Filed July 22, 1968     2 Sheets-Sheet 1

INVENTOR.
Earl B. Cupp
Alton L. Cooke
Wallace F. Payne
Wood, Herron and Evans
ATTORNEYS May 26, 1970  E. B. CUPP ET AL  3,514,331
BATTERY ELECTRODE SEPARATION
Filed July 22, 1968  2 Sheets-Sheet 2

INVENTOR.
Earl B. Cupp
BY Alton L. Cooke
Wallace F. Payne
Hood, Herron and Evans
ATTORNEYS 3,514,331
BATTERY ELECTRODE SEPARATION
Earl B. Cupp and Alton L. Cook, Joplin, and Wallace F. Payne, Carthage, Mo., assignors to Eagle-Picher Industries, Inc., Cincinnati, Ohio, a corporation of Ohio
Filed July 22, 1968, Ser. No. 746,475
Int. Cl. H01m 3/00, 35/00
U.S. Cl. 136—6                                    3 Claims

ABSTRACT OF THE DISCLOSURE

A battery including a plurality of pairs of opposite polarity planar electrodes arranged in closely spaced parallel relation and immersed in a liquid electrolyte, and wrappers or jackets associated with each electrode for separating adjacent electrodes of opposite polarity, each wrapper including electrically insulative structure completely enclosing its associated electrode except for one lateral or side edge thereof which is left exposed. The exposed side edges of all positive electrodes are aligned and face oppositely from the exposed side edges or the negative electrodes which also are aligned.

---

This invention relates to batteries having a plurality of planar closely spaced parallel electrodes of opposite polarity immersed in a liquid electrolyte, and more particularly to separating means for electrically insulating adjacent electrodes of opposite polarity.

A variety of batteries are available in which the electrochemical couple is in the form of a pair of opposite polarity planar electrodes, herein termed "plates," closely spaced and disposed parallel to each other and immersed in a liquid electrolyte. Typically, such batteries employ a plurality of pairs of opposite polarity plates arranged in compressed upstanding face-to-face relation, the exact number of pairs of opposite polarity plates in any battery depending upon the capacity and/or voltage desired.

To avoid adjacent opposite polarity plates from coming into direct physical contact, and thereby short-circuiting a portion of the battery, it has been found necessary to electrically insulate adjacent plates from each other. This has typically been accomplished by positioning electrically insulative material between the plates, the insulative material necessarily being permeable or semi-permeable to the liquid electrolyte to sustain ionic conduction required for battery action. Separation materials of this type are cellophane sheet stock, irradiated polyethylene sheet stock, and the like.

The physical configuration or geometry of the electrically insulative separation material, in accordance with certain prior art proposals, has taken the form of an envelope, jacket, or wrapper which completely encloses or encases one or both of the opposite polarity plates of each electro-chemical couple comprising the battery. For example, in accordance with certain proposals of this general type, each plate is inserted between two overlying parallel panels, each slightly larger than the plate, formed from a single rectangular cellophane sheet folded along a median line. The three free edges of each panel, which are in approximate alignment, are then joined by heat sealing or the like. The heat sealed edges, in combination with the aligned edge of each panel joined by the fold along the median line, function to completely seal the plate within the parallel panels, forming a jacket or envelope which entirely encloses the plate.

While the above separation technique reduces the possibility of short-circuiting adjacent opposite polarity electrodes, it is productive of two problems. One such problem involves the inability to readily vent gasses generated within the plate envelopes during battery charging. Failure to vent gasses generated within the jacket causes the volume of the envelope to increase which, in turn, causes the spacing between the plates to be altered and the electrochemical activity of the cell adversely affected. The second problem relates to the inability of the plates to become rapidly wetted by the liquid electrolyte following introduction of the electrolyte into the battery casing which houses the plates. Slow plate wetting unnecessarily extends the activation time of the battery, increasing the cost of battery fabrication. Slow wetting also prevents the battery from being useful in certain applications where rapid activation is necessary, such as in space vehicle or missile applications where rapid wetting in response to remote battery activation is often a requisite.

Certain prior art proposals, seeking to overcome the foregoing difficulties of the completely enclosed plate jacket, have suggested a plate separation arrangement wherein one of the plates of an adjacent opposite polarity pair is provided with a wrapper which encloses both faces and both side or lateral edges of the plate, leaving the top and bottom edges exposed, while the other plate of the pair is provided with a wrapper which encloses both faces and the top and bottom plate edges, leaving both side or lateral edges exposed. While batteries fabricated utilizing this jacket or wrapper arrangement should theoretically achieve some success in overcoming the problems of the completely enclosed plate wrapper, namely, slow wetting and inability to vent gas, such success is only possible by compromising the short-circuit prevention capability that the completely enclosed wrapper configuration possesses.

Specifically, the partial enclosure wrapper configuration described above, by reason of the close proximity of exposed edges of adjacent opposite polarity plates, for example, the top or bottom of one plate and the lateral or side edges of the other polarity plate adjacent thereto, cause short-circuit paths of relatively short length to exist between adjacent plates of opposite polarity. These paths, in practice, have been found to become readily bridged by dendrites projecting from one or the other of the plates of each pair which appear after the battery has been in use for some specified period of time short of the desirable useful life of the battery. This premature bridging of exposed plate edges and the consequent short-circuiting of adjacent plates by battery action-induced dendrites unnecessarily reduces the capacity and/or output voltage of the battery, and therefore is undesirable.

Additional proposals for wrapping the plates of batteries, other than those described above, have also been made. However, each of the proposals has been deficient in one or more respects, such as slow plate wetting, inability to readily vent gasses, or unduly susceptive to short-circuiting by reason of the existence of short length short-circuit paths between exposed plate edges of adjacent opposite polarity plates.

It has been an objective of this invention to provide an electrode separation system for batteries having planar closely spaced parallel electrodes immersed in a liquid electrolyte which substantially eliminates the short-circuiting problem of prior art separation proposals and yet permits rapid plate wetting and gas venting. This objective has been accomplished in accordance with certain principles of this invention by jacketing the plates in such a manner that each plate has exposed only a single edge, namely, one side or lateral edge, the other side or lateral edge as well as the top and bottom edges and both faces being enclosed; and thereafter assembling the jacketed plates such that all plates of one polarity have their exposed side or lateral edges aligned and facing in one lateral direction, while all plates of the other polarity have their exposed side or lateral edges aligned and facing in the opposite lateral direction.

With the electrode jacketing and plate assembly configuration of this invention, wherein unexposed edges of adjacent plates are oppositely directed, the distance between exposed, unenclosed side edges of adjacent opposite polarity electrodes is at a maximum, namely, the width of the plates, reducing to a minimum the likelihood of short circuits between adjacent opposite polarity plates. Additionally, by locating the unenclosed, or exposed, plate edges at the side of the battery assembly, the plates are susceptive of rapid wetting, under the action of gravity, when the electrolyte is injected into the casing. Finally, gas generated during battery charging is readily vented from the plate wrapper via the unenclosed lateral or side edge, preventing the buildup of trapped gas in the wrapper or jacket.

One of the principal advantages of a battery utilizing the electrode wrapper configuration of this invention, attributable particularly to the almost non-existent susceptibility to short-circuiting, resides in the ability of such a battery to be operated in a flooded condition, that is, completely submerged in electrolyte. As those skilled in the art appreciate, battery operation in a flooded condition is extremely desirable. Such operation provides maximum surface area plate efficiency. It also prevents electrolyte starvation which usually accompanies battery discharge. When a discharged battery is being charged, the electrolyte level is usually low at the beginning of the charge cycle, giving rise to high current densities. These current densities tend to accelerate dendritic growth, particularly the growth of large dendritic crystals which eventually pierce the separator material and prematurely short-circuit the battery. Finally, flooded operation provides a battery having very uniform capacity.

Other objectives and advantages of this invention will be more readily apparent from a detailed description of the invention taken in conjunction with the accompanying drawings in which.

Figure 1:
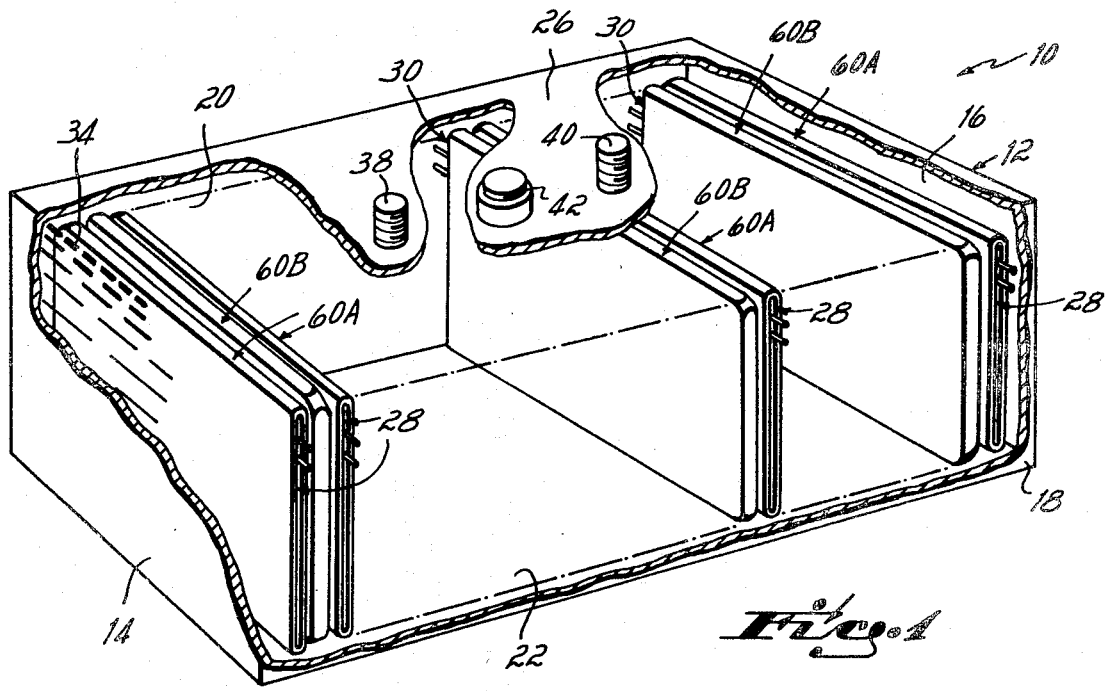
FIG. 1 is a perspective view, partially cut-away, of a flooded battery cell in which the submerged opposite polarity planar electrodes are separated in accordance with the electrode wrapper configuration of this invention.

Referring to FIG. 1, a battery 10 having plate wrappers constructed in accordance with the principles of this invention is disclosed. The battery 10 includes a casing 12 having oppositely disposed lateral or side surfaces 14 and 16, oppositely disposed front and rear surfaces 18 and 20, and oppositely disposed bottom and top surfaces 22 and 24. The casing is dimensioned and configured to completely enclose the array or stack 26 of alternately spaced positive and negative planar electrodes or plates 28 and 30 wrapped in accordance with the principles of this invention and totally immersed in electrolyte 34 to afford operation in a flooded condition. The material from which the casing 12 is fabricated may be of any suitable type which is compatible with the electrolyte and environment in which the battery is used and preferably is made of rigid, semi-rigid, molded, machined, or extruded plastic, such as polystyrene. A casing 12 constructed in accordance with the principles disclosed and claimed in co-pending application entitled Battery Cell Case in the name of Alton L. Cook, Ser. No. 733,366, filed May 31, 1968, has been found to be satisfactory.

The battery 10 further includes a pair of output terminals 38 and 40 which are connected to the electrodes 28 and 30 in any conventional manner. For example, the terminals 38 and 40 may be connected in common to each of the positive electrodes 28 and each of the negative electrodes 30, respectively, to provide an output voltage equal to the characteristic couple voltage exhibited by the particular electrode materials. A removable plug 42 is preferably provided in the top 24 of the casing 12 to permit insertion of the electrolyte 34 into the interior of the casing following positioning therein of the electrode array 26. The plug 42 may be secured in place in the top 24 by suitable means, such as thermal welding, gluing, or the like.

While the wrapper configuration of this invention may be utilized to advantage in batteries employing a variety of electrode and electrolyte materials, a preferred form of electro-chemical couple is silver-zinc immersed in a potassium hydroxide electrolyte solution. In a battery using couples of this type, the positive electrode 28 in the charged or electro-formed state is silver oxide (AgO) and in the discharged state is elemental silver (Ag), while the negative electrode 30 in the charged or electro-formed state is elemental zinc (Zn) and in the uncharged state is zinc hydroxide $(Zn(OH)_2)$.

The positive silver electrode 28 may be fabricated in a number of conventional manners. Preferably, the positive electrode 28 is fabricated by mixing powdered monovalent silver oxide $(Ag_2O)$ with water to provide a slurry. The slurry is placed on filter paper and a vacuum drawn from below to extract a major portion of the water, thereby converting the slurry to a paste. The paste is then placed on a screen or grid, preferably fabricated of silver, to a thickness of .010–.100 inch. The pasted screen is thereafter placed in a sintering oven having an air atmosphere for approximately ten minutes at approximately 900° F. The sintering is effective to convert the monovalent silver oxide to elemental silver as well as to cause the silver to cohere, forming a porous silver matrix layer. The silver screen with the porous silver matrix layer constitutes the positive electrode 28 in the uncharged condition.

The negative electrode 30 may also be fabricated by conventional methods. One preferred form of fabrication includes the use of zinc oxide powder (ZnO) mixed with 1%–3% by weight of carboxymethylcellulose binder. Having mixed the powdered zinc oxide and binder, water is added to provide a loose slurry. The slurry is placed on filter paper and a vacuum drawn from below to extract a major portion of the water, changing the mixture consistency from a slurry to a paste. The paste is then placed on a silver screen or grid to a thickness of approximately .010–.100 inch. The pasted silver screen or grid is dried in an air atmosphere furnace at approximately 200° F. The negative electrode 30 at this point is zinc oxide (ZnO).

The positive electrode 28 of elemental silver and the negative electrode 30 of zinc oxide, which have ratios by weight of silver to zinc of approximately 1:1, are placed in an aqueous solution of 31% by weight potassium hydroxide (KOH) and a source of direct current connected between the electrodes with the positive source terminal connected to the positive electrode and the negative source terminal connected with the negative electrode. Placing the zinc oxide electrode in the electrolytic potassium hydroxide solution converts the negative zinc oxide (ZnO) electrode to zinc hydroxide $(Zn(OH)_2)$. The source of direct current connected in the manner described is effective to electro-form the electrodes, converting the elemental silver positive electrode to silver oxide (AgO) and the zinc hydroxide negative electrode to elemental zinc. With the electrodes so converted, the battery is in the charged condition.

The electro-chemical action of the silver-zinc couple of this invention during battery discharge is believed to be governed by the following equation:

$$AgO+Zn+H_2O \rightarrow Ag+Zn(OH)_2$$

During battery discharge the electro-chemical action at the silver-oxide electrode, which is reduced thereby constituting the cathode, is believed to be governed by the following equation:

$$Ag^{+2}+2 \text{ electrons} \rightarrow Ag$$

During battery discharge the electro-chemical action at the negative zinc electrode, which is oxidized thereby constituting the anode, is believed to be governed by the following equation:

$$Zn+2(OH^{-1}) \rightarrow Zn(OH)_2+2 \text{ electrons}$$

During battery charge, the electro-chemical action of the couple is believed controlled by the following equation:

$$Ag+Zn(OH)_2 \rightarrow H_2O+AgO+Zn$$

The electro-chemical action at the silver positive electrode, which is oxidized thereby constituting the anode, is believed to be governed by the following equation:

$$Ag+2(OH^{-1}) \rightarrow AgO+H_2O+2 \text{ electrons}$$

The electro-chemical action during charging occurring at the zinc-hydroxide negative electrode, which is reduced thereby constituting the cathode, is believed governed by the following equation:

$$Zn(OH)_2+2 \text{ electrons} \rightarrow Zn+2(OH^{-1})$$

The wrapper configuration may also be used with other battery electrodes, for example, the type disclosed in U.S. Pat. 2,727,083, Dec. 13, 1955, Hollman et al., Silver Peroxide Battery and Method of Making.

Figure 2:
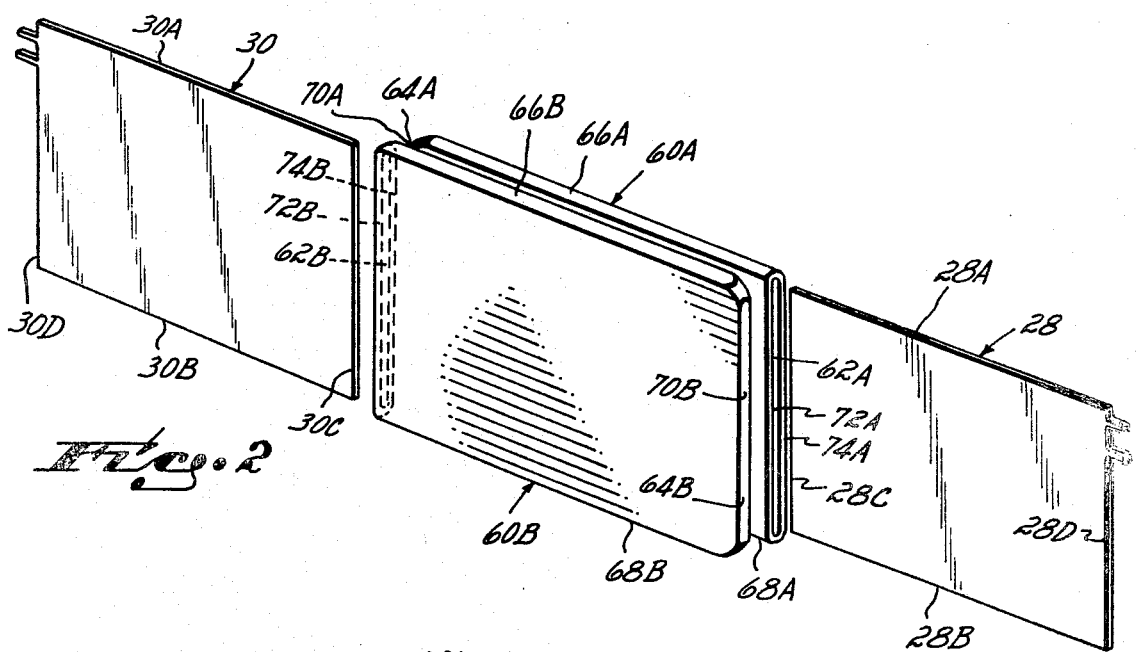
FIG. 2 is an exploded perspective view of a pair of opposite polarity electrodes, the electrodes being removed from their respective wrappers.
Figure 3:
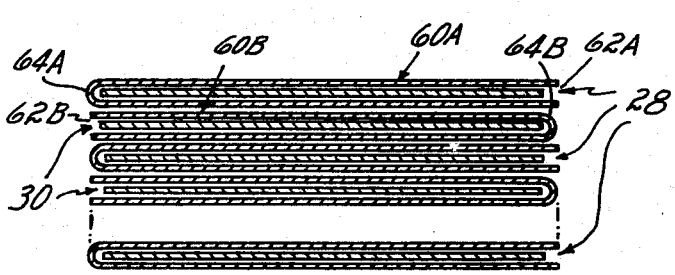
FIG. 3 is a longitudinal cross-sectional view through a plurality of adjacent electrodes further illustrating the manner in which they are wrapped.

Referring to FIGS. 1 and 2, the positive and negative electrodes 28 and 30 are each seen to be provided with wrappers, jackets or envelopes 60A and 60B. Each of the wrappers 60A and 60B includes front surfaces 62A and 62B, respectively, and rear surfaces 64A and 64B, respectively. The upper and lower edges of the front and rear surfaces 62A and 64A of wrapper 60A are joined to form common edges 66A and 68A, completely enclosing the upper and lower edges 28A and 28B of the positive electrode 28. Likewise, one lateral side edge of both surfaces 62A and 64A are joined to form a common edge 70A, completely enclosing the side or lateral edge 28C of the positive electrode 28. The edges 72A and 74A of the front surface 62A are not joined, exposing the edge 28D of the positive electrode 28.

The upper and lower edges of the front and rear surfaces 62B and 64B of the wrapper 60B are joined to form edges 66B and 68B, respectively, completely enclosing the upper and lower edges 30A and 30B of the negative electrode 30. One of the side or lateral edges of both the front and rear surfaces 62B and 64B are joined to form a common edge 70B, completely enclosing the edge 30C of the negative electrode 30. The sealed edge 70B of wrapper 60B is located adjacent the unjoined edges 72A and 74A of the wrapper 60A. The edges 72B and 74B of the surfaces 62B and 64B of the wrapper 60B are not joined, thereby exposing the edge 30D of the negative electrode 30. The exposed edge 30D of the negative electrode 30 is located adjacent the unexposed edge 28C of the positive electrode 28.

From the foregoing description of the wrappers 60A and 60B of the positive and negative electrodes 28 and 30, it is readily apparent that the electrodes are completely enclosed by wrapper material except for one side or lateral edge thereof. It will also be readily apparent from the foregoing description that by reason of the orientation of the adjacent wrappers, the open or unsealed side or lateral wrapper edges of adjacent wrappers are disposed at opposite sides of the electrodes. Such an electrode wrapper configuration and orientation of adjacent electrode wrappers maximizes the distance between the unexposed edges 28C and 30C of adjacent opposite polarity electrodes 28 and 30, thereby reducing to a minimum the likelihood of short circuiting of adjacent electrodes. The absence of short circuit paths of short length between adjacent opposite polarity electrodes permits the battery to be operated in the flooded condition, that is, with a level of electrolyte 34 substantially above the upper edges 28A and 30A of the electrodes 28 and 30, respectively. It will also be appreciated that by reason of locating the open or unsealed wrapper edges on one or the other side or lateral electrode edge, gas generated within the wrappers during battery charging can readily be vented via the unsealed or open wrapper edge.

Figure 4:
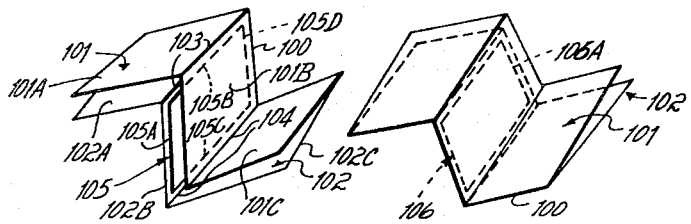
FIG. 4 is a perspective view of one embodiment of an electrode wrapper configuration of this invention providing six thicknesses of wrapper material intermediate each pair of opposite polarity electrodes.

One preferred form of electrode wrapper configuration of this invention is depicted in FIG. 4. In accordance with this wrapper configuration, a sheet of wrapper material having a length slightly in excess of three times the height of the electrode and a width slightly in excess of twice the width of an electrode is folded along a median line 100 forming two equal one-half sections 101 and 102, which are slightly spaced from, and substantially parallel to, each other. The sections 101 and 102 are each divided into three substantially equal panels 101A, 101B, 101C, 102A, 102B, and 102C by folding along lines 103 and 104. The panels 101A and 102A are then folded substantially parallel to the panels 101B and 102B with panels 102A and 102B adjacent each other, while the panels 101C and 102C are folded substantially parallel to panels 101B and 102B with panel 101C adjacent panel 101B.

With the wrapper folded in the manner described, the electrode 105 is inserted between the panels 101B and 102B. Reference to FIG. 4 clearly shows that when a similar wrapper is provided for an adjacent electrode 106 and the wrapped electrodes disposed adjacent each other with their exposed edges 105A and 106A on opposite sides of the battery, a battery wrapper structure having the general configuration as that depicted in FIG. 1 is provided. The top and bottom edges 105B and 105C of electrode 105 are sealed by the fold along lines 103 and 104, while the unexposed lateral edge 105D is sealed by the fold along median line 100. The upper and lower edges as well as one side edge of the electrode 106 are similarly enclosed. The wrapper material may be of any conventional type such as cellophane, regenerated cellophane, woven nylon film, cotton fibre matted non-woven sheet, irradiated polyethylene and the like, having thicknesses of .001–.015 inch.

Figure 5:
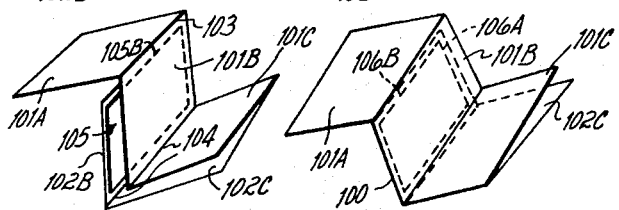
FIG. 5 is a perspective view of a variation of the electrode wrapper configuration of FIG. 4 providing five thicknesses of wrapper material intermediate each pair of opposite polarity electrodes.
Figure 6:
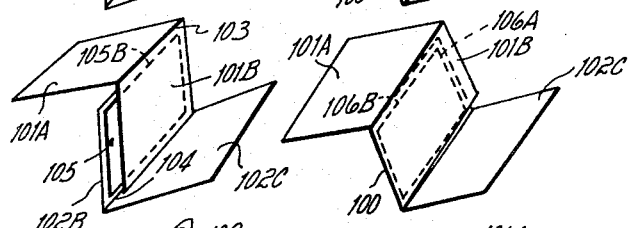
FIG. 6 is a perspective view of a variation of the electrode wrapper configuration of FIG. 4 providing four thicknesses of wrapper material intermediate each pair of opposite polarity electrodes.
Figure 7:
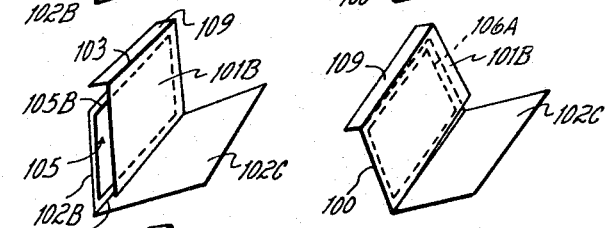
FIG. 7 is a perspective view of a variation of the electrode wrapper configuration of FIG. 4 providing three thicknesses of wrapper material intermediate each pair of opposite polarity electrodes.
Figure 8:
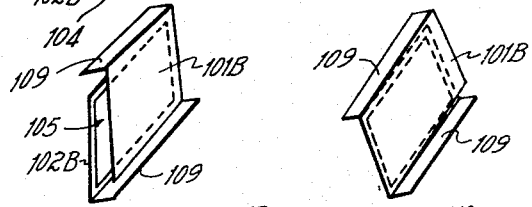
FIG. 8 is a perspective view of a variation of the electrode wrapper configuration of FIG. 4 providing two thicknesses of wrapper material intermediate each pair of opposite polarity electrodes.

It is also noted that with the wrapper configuration of FIG. 4 opposite polarity electrodes adjacent each other are separated by six thicknesses of wrapper material. When adjacent opposite polarity electrodes are wrapped in accordance with the general principles described in conjunction with the wrapper configuration of FIG. 4, the number of thicknesses of wrapper material between adjacent opposite polarity electrodes may be easily varied. For example, with reference to the wrapper configuration depicted in FIG. 5, wherein similar reference numerals are used to describe elements in FIG. 5 having counterparts in FIG. 4, a wrapper configuration is depicted which provides five layers of wrapper material between adjacent opposite polarity electrodes. This is accomplished by removing from the wrapper of each electrode one of the six panels 101A, 101B, 101C, 102A, 102B, or 102C. Preferably, the reduction in wrapper thickness between adjacent opposite polarity electrodes is accomplished by removing one of the interior end panels 102A or 101C at a point adjacent fold lines 103 or 104, respectively, leaving the outer panel 101A or 102C unremoved to enclose electrode edge 105B or 105C when folded along line 103 or 104. By removing two of the six panels 101A, 101B, 101C, 102A, 102B, 102C, preferably by removing both panels 102A and 101C a wrapper configuration of the type depicted in FIG. 6 is produced, providing four layers of wrapper material between adjacent opposite polarity electrodes. A wrapper configuration providing three layers of wrapper material between adjacent opposite polarity electrodes is depicted in FIG. 7. In accordance with this wrapper configuration, three of the panels 101A, 101B, 101C, 102A, 102B, 102C are removed. Preferably two parallel end panels are removed, such as panels 101A and 102B and one inner panel at the opposite end such as panel 101C. Preferably, less than the entirety of outer panel 101A is removed, leaving a panel section 109 adjacent line 103 to enclose the electrode edge 105B when folded. A wrapper configuration providing two layers of wrapper material between adjacent opposite polarity electrodes is depicted in FIG. 8. In accordance with this wrapper arrangement, four of the six panels 101A, 101B, 101C, 102A, 102B, 102C are removed. Preferably, both panels at each end are removed, namely, sections 101A, 102A, 101C and 102C. However, panels 101A and 102C are not removed entirely, leaving panel section 109 to enclose electrode edges 105B and 105C when folded.

Figure 9:
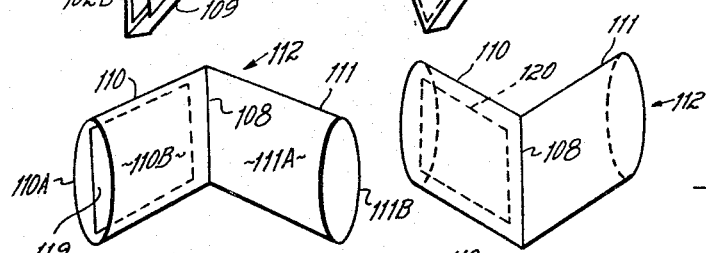
FIG. 9 is another embodiment of an electrode wrapper configuration of this invention utilizing a tubular wrapper material which provides four layers of wrapper material intermediate adjacent opposite polarity electrodes.
Figure 10:
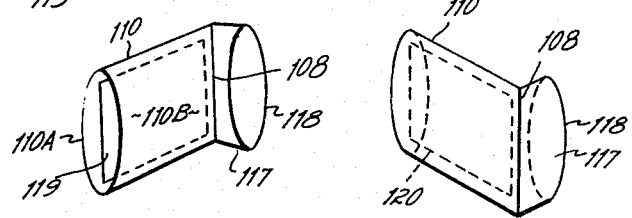
FIG. 10 is a variation of the electrode wrapper configuration of FIG. 9 providing two layers of wrapper material intermediate adjacent opposite polarity electrodes.

A wrapper configuration affording varying thicknesses of wrapper material between adjacent opposite polarity electrodes may also be provided by utilizing tubular wrapper material such as depicted in FIGS. 9 and 10. Referring to FIG. 9, a wrapper configuration is depicted utilizing tubular wrapper material which is capable of providing four thicknesses of wrapper material between adjacent opposite polarity electrodes. The wrapper of FIG. 9 is fabricated by taking tubular wrapper material having a length slightly in excess of twice the width of an electrode and a diameter slightly in excess of the height of an electrode and folding it along a median line 108 into two equal sections 110 and 111 each having oppositely disposed and substantially parallel panels 110A and 110B, and 111A and 111B, respectively. When adjacent opposite polarity electrodes 119 and 120 are inserted into one of the sections 110 or 111 of different wrappers 112 and 113 four thicknesses of wrapper material are seen to separate the electrodes 119 and 120.

The number of thicknesses of wrapper material separating the electrodes can be altered by removing one or more of the panels 110A, 110B, 111A, or 111B of the wrapper. For example, a wrapper configuration of the tubular type providing two thicknesses of wrapper material between adjacent electrodes is depicted in FIG. 10. In accordance with this wrapper configuration, panels 111A and 111B of unoccupied section 111 are substantially but not totally removed at a point adjacent the median line 108 leaving a small section 117 thereof to enclose the edge 118 of the electrode 119 disposed adjacent and parallel thereto.

Figure 11:
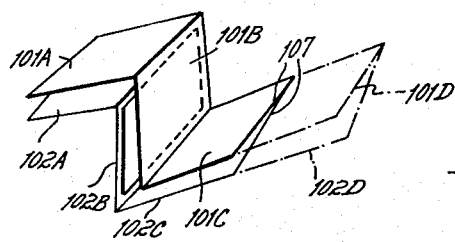
FIG. 11 is a variation, illustrated in phantom, of the electrode wrapper of FIG. 4 which provides two additional layers of wrapper material intermediate the electrodes.

As can be seen in FIG. 11, the number of thicknesses of wrapper material separating adjacent opposite polarity electrodes can be increased over the six layers depicted in FIG. 4 by lengthening the wrapper material to provide additional panels such as 101D and 102D. Panels 101D and 102D can be folded along a median line 107, placing these panels parallel to the panels 101C and 102C, thereby adding two additional thicknesses of wrapper material between each pair of opposite polarity electrodes to provide a total electrode separation of eight thicknesses of wrapper material. By adding only one of the sections 101D or 102D, a single additional wrapper thickness may be provided yielding a total separation of seven wrapper thicknesses between adjacent electrodes. By adding further additional sections of one or two panels, a wrapper can be provided affording inter-electrode wrapper thicknesses in increments of one or two as desired.

Having described the preferred embodiment of our invention, what we desire to claim and protect by Letters Patent is:

1. A battery comprising:
   a positive planar electrode and a negative planar electrode, each having front and rear parallel faces and bottom, top, and opposite side edges, said positive and negative electrodes being disposed closely adjacent and parallel to each other;
   a liquid electrolyte in which said positive and negative electrodes are immersed;
   a positive electrode wrapper structure substantially enclosing said front and rear surfaces, said top and bottom edges, and one of said lateral edges of said positive electrode, leaving unenclosed by said positive wrapper structure the other lateral edge of said positive electrode; and
   a negative electrode wrapper structure enclosing said front and rear surfaces, said top and bottom edges, and one of said lateral edges of said negative electrodes, leaving unenclosed by negative electrode wrapper structure and the other lateral edge of said negative electrode, the enclosed and unenclosed lateral edges of said negative electrode being adjacent said unenclosed and enclosed lateral edges of said positive electrode, respectively, thereby separating the unenclosed lateral edges of said adjacent positive and negative electrodes by a distance substantially equal to the distance between the lateral edges of one of said positive and negative electrodes.

2. The battery of claim 1 wherein each of said wrappers comprises a flattened tube in which its respective electrode is inserted, each of said tubes having one open end disposed adjacent one of the lateral edges of its respective electrode to leave unenclosed by said tube said one lateral edge, and a fold intermediate the other end and its respective electrode to enclose the other lateral edge of its respective electrode opposite said unenclosed edge, the unenclosed and enclosed edges of one electrode being adjacent the enclosed and unenclosed edges of an adjacent electrode, respectively.

3. The battery of claim 1 wherein each of said wrappers comprises a sheet folded along a median line and at least two lines normal to said median line spaced from each other by at least the height of said electrode thereby enclosed one lateral electrode edge and the top and bottom electrode edges, respectively, of an electrode inserted between the wrapper panels defined by said median line and said spaced lines normal to said median line.

References Cited
UNITED STATES PATENTS

| | | | |
|---|---|---|---|
| 2,786,089 | 3/1957 | Pucher | 136—147 |
| 2,851,512 | 9/1958 | Andre | 136—147 |
| 2,905,738 | 9/1959 | Di Pasquale et al. | 136—6 |

WINSTON A. DOUGLAS, Primary Examiner

A. SKAPARS, Assistant Examiner

U.S. Cl. X.R.

136—111, 131, 147